Figure 1:
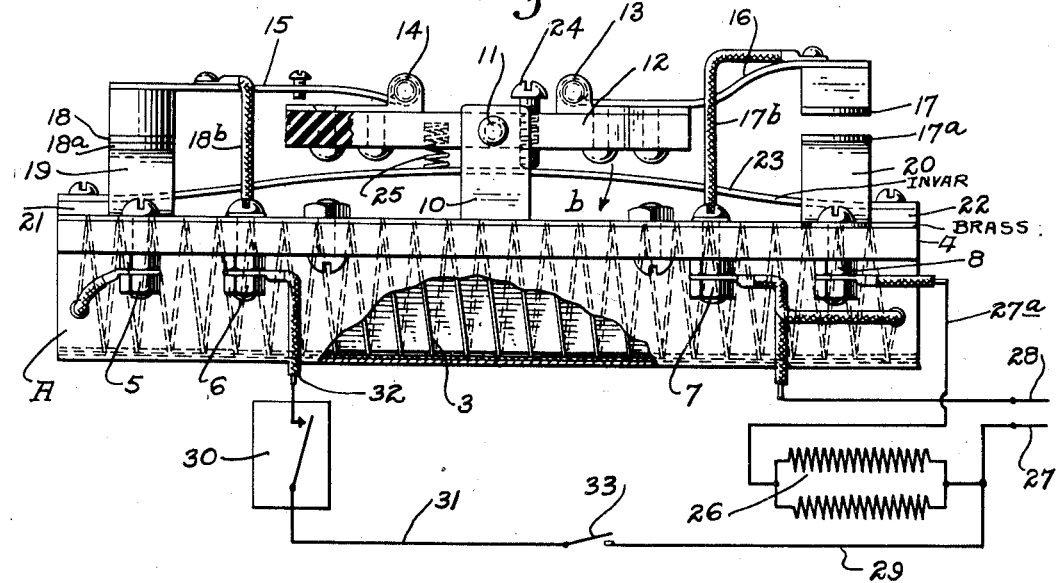

June 21, 1932. H. A. MULVANY 1,864,049

METHOD AND APPARATUS FOR CONTROLLING ELECTRIC CIRCUITS

Filed April 29, 1930

INVENTOR.
Harry A. Mulvany.
BY
Townsend, Loftus & Abbett
ATTORNEYS.

Patented June 21, 1932

1,864,049

UNITED STATES PATENT OFFICE

HARRY A. MULVANY, OF BERKELEY, CALIFORNIA

METHOD AND APPARATUS FOR CONTROLLING ELECTRIC CIRCUITS

Application filed April 29, 1930. Serial No. 448,250.

This invention relates to a method and apparatus for controlling electric circuits and especially electrically actuated apparatus where temperature control is an important factor.

In the control of temperature with thermostats it is customary in electric circuits to provide the thermostat with two contacts known as maximum and minimum contacts, or to have the thermostat contact lever work against a spring such as a wave spring which snaps on and off when sufficient force is applied; the purpose of these arrangements being to provide a definite on and off movement. When maximum and minimum contacts or a spring arrangement is used a definite change of temperature will have to take place before a contact lever will move between two limits or apply sufficient force to a spring to obtain the snap action necessary for a quick break. In practice it is found to be about 2° plus or minus of the desired temperature arranged, a range too great for the best operation of refrigerators and many other devices.

Thermostats are also employed in which the element responding to a temperature change is a bi-metallic strip equipped with but one set of contacts. If this type of thermostat is sensitive the slightest vibration when it is about ready to open the contacts will cause repeated opening and closing of the contacts sufficient in a short time to seriously burn the contacts and damage relays and other electrical apparatus in the circuit.

The object of the present invention is to generally improve and simplify the construction and operation of electric circuit controlling devices of the type above referred to; to provide an electric circuit controlling device employing the best features of thermostats now in use and capable of maintaining a predetermined temperature within a range of a fraction of a degree; to provide an electric circuit controlling device in which the main circuit connecting or breaking contacts are actuated by an electrically heated expansion element; to provide a second set of contacts actuated by the electrically heated expansion element whereby a circuit through the electrically heated expansion element is controlled to prevent overheating of the expansible element; to provide a sensitive type of thermostatic switch whereby the circuit through the electrically heated expansion element is controlled when the second named contacts are closed; to provide an electric circuit controlling device capable of remote control operation so as to be far removed from the apparatus controlled; and further, to provide an electric circuit controlling device which is simple, compact and rugged in construction and provided with contact actuating mechanism insuring positive on and off movement and maintenance of a constant temperature.

The invention is shown by way of illustration in the accompanying drawing, in which—

Figure 2:
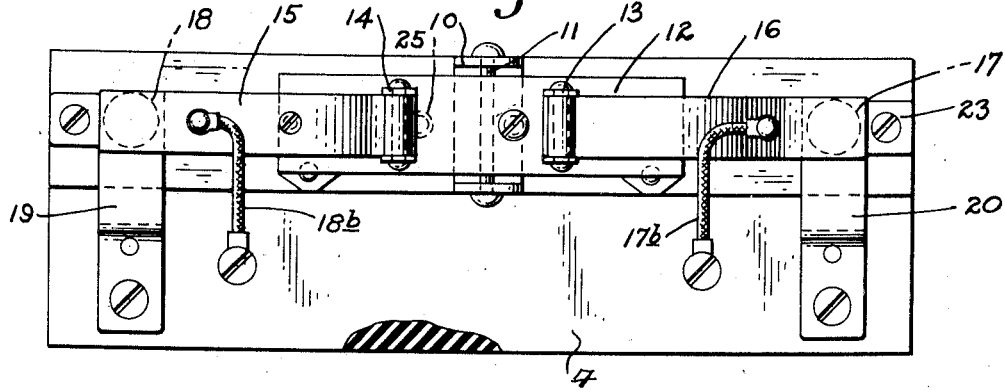
Figure 3:
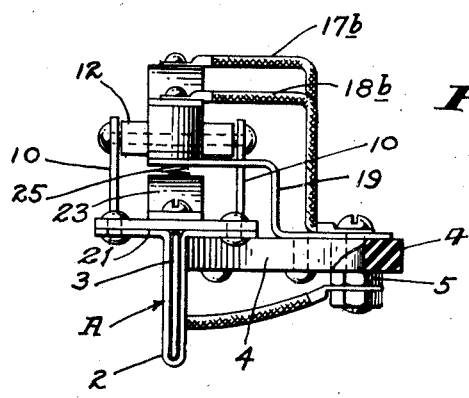

Fig. 1 is a side elevation of the apparatus for controlling electric circuits, said side elevation including a wire diagram showing the circuits controlled thereby, Fig. 2 is a plan view of the apparatus, and Fig. 3 an end view of the same.

Referring to the drawing in detail and particularly Figs. 1 and 2, A indicates an expansion member which is T-shaped in cross section. It is constructed of brass or any other suitable material and is bent from a sheet of flat material to form a U-shaped leg 2, the walls of which are interspaced to form a space for the reception of a heating element generally indicated at 3. The heating element consists of a resistance wire wound around a strip of insulating material such as mica or the like. This coil is inserted in the space formed between the walls 2 of the T-shaped member and is insulated therefrom. The T-shaped member is supported by a strip of insulating material such as indicated at 4 and this strip carries terminal connectors indicated at 5, 6, 7, and 8. One end of the heating coil or resistance wire is connected to the member 5 while the opposite end is connected to the member 7 and the circuit through the heating coil will be hereinafter described. Supported by the T-shaped member is a bearing bracket such as indicated at 10 and pivotally supported by the bracket as at 11 is an arm 12 constructed of insulating material on which is pivotally mounted as at 13 and 14 a pair of arms 15 and 16 which terminate in contact members 17 and 18. Supported by the insulating strip 4 are brackets 19 and 20 and these brackets terminate in contact members 17a and 18a. Secured at the points 21 and 22 at the outer ends of the expansion member A is a strip of non-expanding metal such as invar or the like. This strip is indicated at 23 and it is bowed as shown in Fig. 1 to permit free compression or extension thereof as will hereinafter be described. Carried by the arm 12 is an adjustable screw 24 and interposed between the arm and the invar strip 23 is a spring 25 which insures contact between the screw and the invar strip.

For the purpose of description it will be supposed that the apparatus is to be employed for the purpose of controlling a circuit through a heater such as diagrammatically indicated at 26. This heater is supplied with current through line wires 27 and 28. Wire 27 connects with one end of the heater and wire 27a connects with the terminal connector 8, wire 28 being connected with the terminal connector 7. The heater 26 may be employed for any purpose desired, for instance, to maintain a predetermined temperature in a room or the like and for the purpose of making or breaking a circuit therethrough when a predetermined temperature is reached. A standard form of thermostat is employed as diagrammatically indicated at 30. The thermostat may be of the single contact type and exceedingly sensitive. One of the contacts is connected with the line wire 29 through wire 31 while the other contact is connected through wire 32 with the terminal connector 6, terminal connectors 6 and 7 being connected with the contacts 17 and 18 through flexible connections such as shown at 17b and 18b.

In actual operation if the switch indicated at 33 is closed a circuit will be formed through wire 29, switch 33, the contacts of the thermostat 30, wire 32, connector 6, wire 18b, contacts 18 and 18a, connector 5, heating coil 3, connector 7 and wire 28. With this circuit established coil 3 will gradually heat and the expansion member A will gradually expand. As the member A expands invar strip 23 becomes extended permitting arm 12 to swing in the direction of arrow b contacts 17 and 17a will finally close and the circuit is in that manner closed through the heater 26. This circuit can be traced as follows: through wire 27, the current passes through heater 26, wire 27a, connector 8, contact 17a, contact 17, flexible connector 17b, connector 7 and wire 28. This circuit when closed causes a continuous current flow through the heater B and when a predetermined temperature is reached the contacts in the thermostat 30 will open thereby breaking the circuit through the heating coil 3. Expansion member A will immediately start cooling and as it cools the contacts cause the bow in the invar strip to increase and thereby transmit a reverse movement to the arm 12 and if the circuit through the coil is not closed within a predetermined period of time contacts 17 and 17a will separate and the circuit through the heater will be broken. On the other hand it is possible that the temperature in the room may drop fairly rapidly, in that case the contacts in the thermostat 30 will again close. In fact, where a sensitive thermostat is employed the slightest temperature change will cause opening and closing of the contacts, hence it is possible that the current may be on and off of the coil 3 without causing opening of the contacts 17 and 17a but if a predetermined temperature is reached and maintained in a room the contacts in the thermostat will separate and the current through the contacts 17 and 17a will be broken. In an apparatus of this character it is also essential that excessive heating of the expansion member A be prevented. Contacts 18 and 18a serve this function. When the expansion member A reaches a predetermined temperature arm 12 moves in the direction of arrow b to such an extent that contacts 18 and 18a are separated, and as these cooperate with the thermostat 30 to make or break the circuit through the heating coil 3 it is obvious that the circuit through said coil may be broken either by the contacts in the thermostat or by the contacts 18 and 18a, hence it is possible that the current flow through the heating coil 3 is continuously interrupted either by the thermostat or by the contacts 18 and 18a.

In other words a straight line temperature curve may be maintained.

In actual practice it has been found that a predetermined temperature may be maintained constant within a temperature range of one-half degree or less. This is of course impossible where double contacts are employed as a temperature range between 2° plus and 2° minus is usually required to obtain a full on and off position. It is possible in the present instance as three switches are employed, to-wit, the sensitive thermostat switch 30, the main power switch comprising contacts 17 and 17a, and the secondary switch comprising contacts 18 and 18a. The sensitive thermostat switch will operate on temperature variations of a half degree or less and as such will make or break a circuit through the heating element 3. If this circuit is maintained for any length of time the expansion element A will become elongated thus permitting spring 22 to rock the arm 12 and thereby cause contacts 17 and 17a to engage and when these are closed a circuit through the heater 26 is closed. If the switch 31 should remain closed for a considerable period of time the heating coil 3 and the expansible element A heated thereby would become overheated. In order to prevent such overheating the secondary switch comprising contacts 18 and 18a is employed. When the expansible element has expanded a predetermined amount contacts 18 and 18a open as they are carried by the arm 12, thus the circuit through the coil 3 is broken even though switch 30 is closed. The secondary switch accordingly performs a certain function, to-wit, that of overheating the expansible element A, and it is largely due to this fact that an even constant temperature may be maintained. For instance, if the expansible element A should become overheated and switch 30 opened it would take a comparatively long time for the expansible element to cool sufficiently to open the contacts 17 and 17a. Such a time lag might permit the room warmed by the heater 26 to become too cool, but due to the fact that the secondary switch is employed such time lag will not take place and it is accordingly possible to maintain an even constant temperature. The apparatus here shown may be employed in connection with compressor plants, pumping plants and the like for instance, in a compression plant an electric motor is substituted for the heater 26 and the apparatus controls the circuit through the motor when a predetermined pressure is obtained. A pressure actuated mechanism may open or close the circuit through the heating coil 3, hence breaking the circuit through the motor when a predetermined pressure is obtained and again closing the circuit through the coil when the pressure drops below a predetermined pressure. In pumping plants where a pump is driven by an electric motor and where the pump discharges into a tank or reservoir a float actuated mechanism may be employed to make or break the circuit through the coil, hence starting the pump when the water drops below a certain level and stopping the pump when a predetermined water level is reached. In fact from the foregoing description it is obvious that the apparatus is not dependent upon a temperature actuated mechanism for making or breaking the circuit through the heating coil as a pressure actuated, flow actuated, or mechanically actuated mechanism may just as well be employed. The apparatus is however particularly intended for use in installations where exact temperature is required as in refrigerator plants, heating plants and the like and in that case a sensitive thermostat of the type shown at 30 will be employed.

The apparatus shown has numerous advantages: First, it may be stated that it is noiseless in operation; Secondly, by selection of proper materials such as brass and invar enormous force may be applied to open and close the contacts 17 and 17a, thus providing insurance against welding and sticking of the contacts; Third, positive and continuous action in opening and closing the contacts 17 and 17a is insured; Fourth, by providing a heating element 3 which permits comparative slow heating and cooling of the expansion member, a time element or lag is obtained permitting numerous breaks of the circuit passing through the heating coil without effecting the main circuit controlled by the contacts 17 and 17a thus making it possible to obtain a substantially straight line temperature curve; Fifth, the slow and positive action of the contacts 17 and 17a reduce wear to a minimum and entirely eliminate pounding, vibration, etc. such as is encountered in magnetic and spring actuated contactors and the like; Sixth, the apparatus may be placed at points remote from the apparatus or circuit to be controlled; Seventh, over heating of the expansion member or damage to the heating coil is prevented by the contacts 18 and 18a.

While certain features of the present invention are more or less specifically described, I wish it understood that various changes may be resorted to within the scope of the appended claims. Similarly, that the materials and finishes of the several parts employed may be such as the manufacturer may decide, or varying conditions or uses may demand.

Having thus described my invention, what I claim and desire to secure by Letters Patent is—

1. In a device of the character described, an expansion member, an electrically energized heating coil whereby it is actuated, a main electric circuit controlled by the expansion member, and means actuated by the expansion member for making and breaking a circuit through the heating coil to prevent excess heating of the expansion member.

2. In a device of the character described, an expansion member, an electrically energized heating coil whereby it is actuated, a main electric circuit controlled by the expansion member, a temperature actuated circuit making and breaking device controlling the circuit through the heating coil, and means actuated by the expansion member for making and breaking a circuit through the heating coil to prevent excess heating of the expansion member.

3. In a device of the character described, an expansion member, an electrically energized heating coil whereby it is actuated, a main electric circuit controlled by the expansion member, a thermostat for making and breaking the circuit through the heating coil, and means actuated by the expansion member for making and breaking a circuit through the heating coil to prevent excess heating of the expansion member.

4. In a device of the character described, an elongated expansion member, an electric resistance heating element cooperating therewith to cause expansion or contraction of the expansion member, a flexible bowed substantially non-expanding member secured to the expansion member, the bow in said member increasing or decreasing as expansion or contraction of the expansion member takes place, an arm pivotally supported adjacent the expansion member, means whereby movement of the non-expanding member is transmitted to rock said arm, a switch adapted to be opened and closed by rocking movement of the arm, said switch controlling an electric circuit, a temperature actuated circuit making and breaking mechanism controlling the circuit through the electric resistance heating element, and a second switch adapted to be opened and closed by rocking movement of the arm, said switch also adapted to make or break the circuit through the electric resistance heating element to prevent excess heating of the expansion member.

HARRY A. MULVANY.